United States Patent
Henttonen et al.

(10) Patent No.: US 8,612,593 B2
(45) Date of Patent: Dec. 17, 2013

(54) EXTENDED PROXIMITY INDICATION FOR PRIVATE CELLS

(75) Inventors: Tero Henttonen, Espoo (FI); Kennett Aschan, Helsinki (FI)

(73) Assignee: Renesas Mobile Corporation, Tokyo (JP)

( * ) Notice: Subject to any disclaimer, the term of this patent is extended or adjusted under 35 U.S.C. 154(b) by 77 days.

(21) Appl. No.: 13/177,920

(22) Filed: Jul. 7, 2011

(65) Prior Publication Data
US 2013/0013797 A1    Jan. 10, 2013

(51) Int. Cl.
*G06F 13/00*    (2006.01)

(52) U.S. Cl.
USPC .............................. 709/225; 709/249; 455/436

(58) Field of Classification Search
USPC .......... 709/223, 224, 225, 230, 249; 455/436, 455/437
See application file for complete search history.

(56) References Cited

U.S. PATENT DOCUMENTS

| | | | |
|---|---|---|---|
| 8,165,590 B2 * | 4/2012 | Gunnarsson et al. ......... | 455/446 |
| 8,194,630 B2 * | 6/2012 | Qvarfordt et al. ............. | 370/338 |
| 2009/0197570 A1 * | 8/2009 | Horn et al. .................... | 455/410 |
| 2010/0003965 A1 | 1/2010 | Kurz et al. .................... | 455/411 |
| 2011/0263274 A1 * | 10/2011 | Fox et al. ................... | 455/456.2 |

FOREIGN PATENT DOCUMENTS

| | | |
|---|---|---|
| EP | 2 169 972 A1 | 6/2008 |
| EP | 2 214 434 A1 | 8/2010 |
| WO | 2010050140 A1 | 5/2010 |
| WO | WO 2010/110706 A1 | 9/2010 |
| WO | 2010120837 A1 | 10/2010 |
| WO | WO 2010/122421 A1 | 10/2010 |
| WO | WO 2010/148943 A1 | 12/2010 |
| WO | 2011004599 A1 | 1/2011 |

OTHER PUBLICATIONS

3GPP TS 23.401 V10.4.0 (Jun. 2011), 3rd I Generation Partnership Project; Technical Specification Group Services and System Aspects; General Packet Radio Services (GPRS) Enhancements for Evolved Universal Terrestrial Radio Access Network (E-UTRAN) Access, (Release 10), (281 pages).
3GPP TS 36.331 V10.1.0 (Mar. 2011), 3rd Generation Partnership Project; Technical Specification Group Radio Access Network; Evolved Universal Terrestrial Radio Access (E-UTRA); Radio Resource Control (RRC); Protocol Specification, (Release 10), (290 pages).
Clarification on Inbound Mobility to CSG and Hybrid Cells:, 3GPP Draft TSG RAN WG3 Meeting #71, Taipei, Taiwan, Feb. 21-25, 2011, R3-110598.

* cited by examiner

*Primary Examiner* — Viet Vu

(57) ABSTRACT

A user equipment UE stores a first list of private cells to which the apparatus is authorized to access (e.g., a CSG whitelist). While under control of a serving first cell, the UE determines from a transmission received from a neighbor second cell a physical cell identity PCI of the neighbor cell, then compares the determined PCI to a stored second list to determine whether the UE is authorized to access the neighbor cell. In one embodiment the second list maps PCIs to CSG IDs; if the determined PCI matches one in the second list the CSG ID is selected and it that matches one in the first list the UE is authorized access. In another embodiment the second list is only the PCI of those CSG cells on the UE's first list that are within the area served by the serving cell, so if the determined PCI matches one in the second list the UE is authorized access.

17 Claims, 5 Drawing Sheets

EXTENDED PROXIMITY INDICATION FOR PRIVATE CELLS

TECHNICAL FIELD

The exemplary and non-limiting embodiments of this invention relate generally to wireless communication systems, methods, devices and computer programs, and more specifically relate to enabling a user equipment to determine whether or not the user equipment is authorized access to a neighbor/private cell. In the LTE system such private cells are termed cells of a closed subscriber group, other radio technologies may use different terminology.

BACKGROUND

The following abbreviations used in the specification and/or the drawings are defined as follows:
- 3GPP third generation partnership project
- CSG closed subscriber group
- DL downlink (network towards UE)
- eNodeB base station of a LTE/LTE-A system
- E-UTRAN evolved universal terrestrial radio access network
- ID identifier
- LTE long term evolution (of the E-UTRAN system)
- MAC medium access control
- MME mobility management entity
- PLMN public land mobile network
- S-GW serving gateway
- SCH shared channel
- RRC radio resource control
- UE user equipment
- UL uplink (UE towards network)

In the E-UTRAN system relevant to these teachings there are conventional network access nodes/cells termed eNodeBs which serve all users, and also subscriber group CSG cells such as home eNodeBs which are available for traffic (voice and/or data) to only those subscribers registered with the CSG and possibly also certain allowed guests. Any given CSG may include a group of cells (such as a corporate or university campus) or a single cell. CSGs may allow traffic access for non-subscribers for emergency calls but these teachings relate to routine, non-emergency access.

These different types of cells or access nodes may be termed more generally as public access nodes/public cells and private access nodes/private cells. Other wireless systems (GERAN, GSM, UTRAN, WCDMA) have either implemented or are considering implementing similar such private networks as more functionality is shifted from higher in the radio access network toward the base stations/access nodes.

In the LTE system the UE is to keep a list, termed a CSG whitelist or CSG allowed list, which recites all the identities of the CSG cells for which that particular UE has access rights. The wireless specifications at 3GPP TS 36.300 for LTE Release 9 stipulate that an E-UTRAN network may configure a UE to report that the UE has detected that it has entered or left the proximity of a CSG cell to which the UE is allowed to connect. In the art these are termed proximity indications, and their purpose is to help to facilitate UE handovers from macro cells to CSG cells. Such handovers tend to improve the efficient use of network resources since after the handover that UE's traffic is offloaded from the conventional cellular network macro cells to instead pass through the CSG cell(s).

More specifically, 3GPP TS 23.401 states that the UE is to keep this CSG whitelist, which can be either the "allowed CSG list" or the "operator CSG list" contained in the so-called UE context which is provided by the UE's home network to any other networks the UE is transiting. Each CSG list has the form of a list of CSG IDs and the associated PLMNs. Each CSG ID reliably identifies a CSG, which as above might include a single CSG cell or multiple CSG cells.

FIG. 1 illustrates a relevant wireless environment; a UE 20 is connected to a macro cell 22 and moving toward a CSG cell 24. While only one is shown, in practice there may be many CSG cells from different CSGs and the UE may be a subscriber to only one or a few of those CSGs. In order for the UE 20 to determine whether or not it has access rights to that CSG cell 24 it must acquire the CSG ID of that CSG in order to check it against the UE's own CSG whitelist.

The most accurate way to determine the CSG ID of a CSG cell 24 is for the UE 20 to read the system information of that cell 24. The UE 20 will read the CSG ID from the System Information Block Type1 message which is part of the system information broadcast by the CSG cell 24 on the DL-SCH as set forth at 3GPP TS 36.331. Herein lies a problem; reading system information of a neighbor (non-serving) cell means the UE cannot at the same time remain in contact with the macro (serving) cell 22 to which it is in a connected state (assuming as is typical that the UE is using the same radio receiver to tune between the CSG cell's broadcast channel and the macro cell's DL control channel over which resource allocations or pages are sent). If there were only one CSG cell 24 as in FIG. 1 the problem is minor, but where there are multiple CSG cells this can easily result in disrupting normal communications between the UE 20 and its connected macro cell 22. The inventors consider that it is not desirable to require UEs to read the system information of every neighbor cell whose broadcast channel they can hear, for this makes the UE less available to its serving cell for regular data transmissions.

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: store in the at least one memory a first list of private cells to which the apparatus is authorized to access; while under control of a serving first cell, determine from a transmission received from a neighbor second cell a physical cell identity of the neighbor second cell; and compare the determined physical cell identity to a second list stored in the at least one memory to determine whether the apparatus is authorized to access the neighbor second cell.

In a second exemplary embodiment of the invention there is a method comprising: storing in a memory of an apparatus a first list of private cells to which the apparatus is authorized to access; while under control of a serving first cell, determining from a transmission received from a neighbor second cell a physical cell identity of the neighbor second cell; and comparing the determined physical cell identity to a second list stored in the memory to determine whether the apparatus is authorized to access the neighbor second cell.

In a third exemplary embodiment of the invention there is a computer readable memory storing a computer program, in which the computer program comprises: code for storing in a memory of an apparatus a first list of private cells to which the apparatus is authorized to access; code for determining from a transmission received from a neighbor second cell, while the apparatus is under control of a serving first cell, a physical cell identity of the neighbor second cell; and code for comparing the determined physical cell identity to a second list stored in the memory to determine whether the apparatus is authorized to access the neighbor second cell.

These and other embodiments and aspects are detailed below with particularity.

DETAILED DESCRIPTION

While past practice has often assumed that the UE 20 would read the system information block of the neighbor cells, in fact a close reading of the LTE specifications reveal that they do not stipulate a specific mechanism by which the UE 20 is to determine the CSG ID of its neighbor CSG cells 24. The UE 20 may be requested by it serving cell 22 to read the system information of neighbor cell 24, but this is a deliberate procedure initiated by serving cell 22 and disrupts communication between UE 20 and the serving cell 22 for the duration of the system information reading. In principle then the UE manufacturers might choose to base their proximity indications on some less accurate information, such as the ID of the macro cell 22 or the PCI of the CSG cell. In LTE the PCI is not unique per cell and so the CSG ID is a more reliable cell identifier (though the global cell ID GCID formed by combining the PCI, CSG ID and the PLMN ID is the truly unique identifier for a CSG cell). There are only 504 possible PCIs, and so in a given PLMN such as any moderately-sized city with included suburbs there is likely to be more than 504 distinct access nodes and so some PCIs will be re-used within the same PLMN. In practice the re-used PCIs are assigned to cells which are physically distant from one another but any optimization in this regard tends to diminish as cells are added and re-positioned over time. In LTE the cell uses its PCI to transmit data, and the CSG ID (or other type of Cell ID for non-CSG cells) is used to identify the cell since it is far more reliable in identifying a specific CSG cell than is the PCI. This is different than GSM which uses the unique cell ID for both purposes. One non-limiting manner by which a UE can obtain the PCI of an LTE neighbor private cell is by reading it from the synchronization signal which the private cell broadcasts. This reading process is a normal measurement operation supported by all LTE UEs.

Neither the macro cell's unique CELL ID nor the CSG cell's PCI are sufficiently accurate for proximity indications and so they cannot reasonably be used for facilitating handovers and cell re-selections. This is because the inaccuracies inherent in them would likely result in dropped connections during attempted handovers from a macro cell to a CSG cell. Typical UE manufacturers tend to avoid such flaws that are so manifest to the users, and network operators generally will not take proximity indications into use if their inaccuracy routinely results in handover-related dropped connections.

The solution is for the UE to obtain the CSG ID but without having to decode system information from all the neighbor cells it sees. Such a solution is detailed below in the context of an LTE system, recognizing this is but one example and the broader teachings herein can be employed also with other types of radio access technologies.

Figure 1:
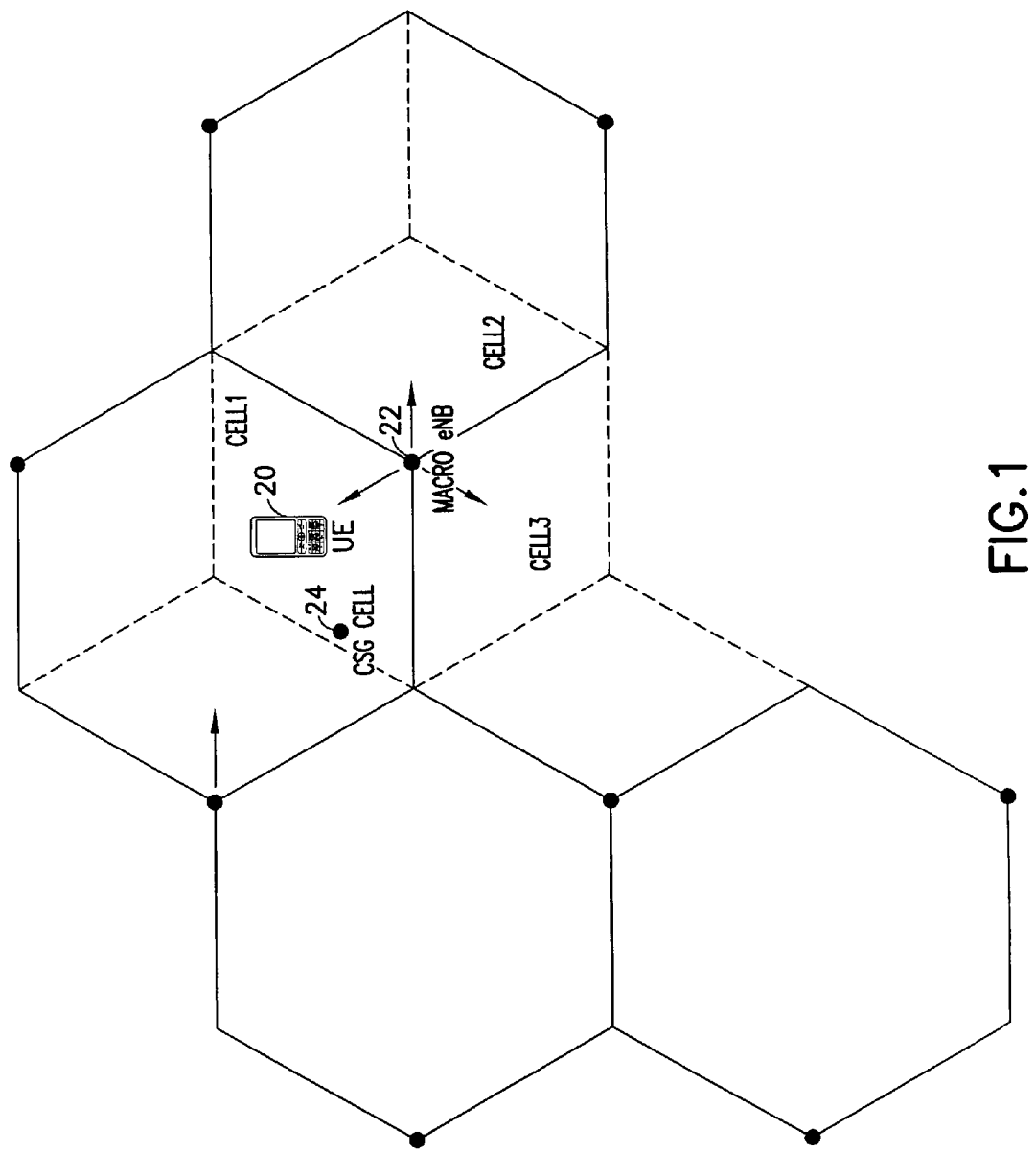
FIG. 1 is a schematic diagram illustrating an environment in which embodiments of the invention may be practiced to advantage.

Referring again to FIG. 1, consider the macro cell 22 as a first cell which is the serving cell for the UE 20, and the CSG cell 24 as a second cell which is a neighbor cell which the UE will determine according to these teachings is or is not a CSG cell to which the UE 20 is authorized access (e.g., whether the UE 20 is a subscriber or authorized guest for that CSG cell 24). There is a first list stored in the UE's local memory which is the UE's CSG whitelist mentioned above, which lists the CSG IDs of the CSG cells which the UE 20 is authorized to access. There is also a second list stored in the UE's local memory which may take different forms according to the first and second embodiments below. At minimum the second list has the physical cell IDs. While a more generic term for CSG ID is simply cell ID, the term physical cell identity is itself generic also since a few different radio access technologies employ physical IDs for cells as well as various forms of a cell identifier. As used herein, cell identifier and physical cell identity refer to different types of IDs, with cell identifier representing the more reliable of the two for uniquely identifying a given cell. In some embodiments the cell identifier may be truly unique and in others, such as the CSG ID in the LTE system it is not quite unique but a better choice for reliably identifying a cell than is PCI.

In accordance with an exemplary embodiment, the UE 20 stores in its local memory that first list, which is the private cells to which the UE 20 is authorized to access. While under control of the serving first cell 22 (e.g., in a connected state or idle state or various other states in different radio technologies), the UE 20 then determines from a transmission by the neighbor second cell 24 a physical cell identity of the neighbor second cell 24. By example such a transmission may be a synchronization signal which the neighbor second cell 24 broadcasts on its primary broadcast channel; it is far less power intensive and time consuming for the UE 20 to receive and decode the synchronization signal than it is to receive and decode an entire system information block.

Then the UE 20 compares the determined physical cell identity to the second list which is also stored in its local memory, to determine whether the UE 20 is authorized to access the neighbor second cell. In a first embodiment detailed below this second list is a mapping of PCIs to CSG-IDs, and so once the UE 20 matches the PCI obtained from the synchronization signal it can know from the second list the CSG-ID of the neighbor second cell 24. Then by checking this CSG-ID against the first list (CSG whitelist) which has the allowed CSG IDs the UE 20 can assume whether or not it is authorized to access that neighbor second cell 24. In the second embodiment detailed below the second list is a list of PCIs, tailored for the UE 20 by the network which provides it to contain the PCIs of only those CSG cells which are on the UE's first list and which are also in the coverage area of the UE's serving first cell 22. In this second embodiment, matching the PCI obtained from the synchronization signal to a PCI in the second list is sufficient for the UE 20 to assume it can access that neighbor second cell 24. Common to both embodiments, the UE 20 gets the PCI information of its member CSG cells from the macro eNodeB 22 based on the UE's CSG whitelist.

Figure 2:
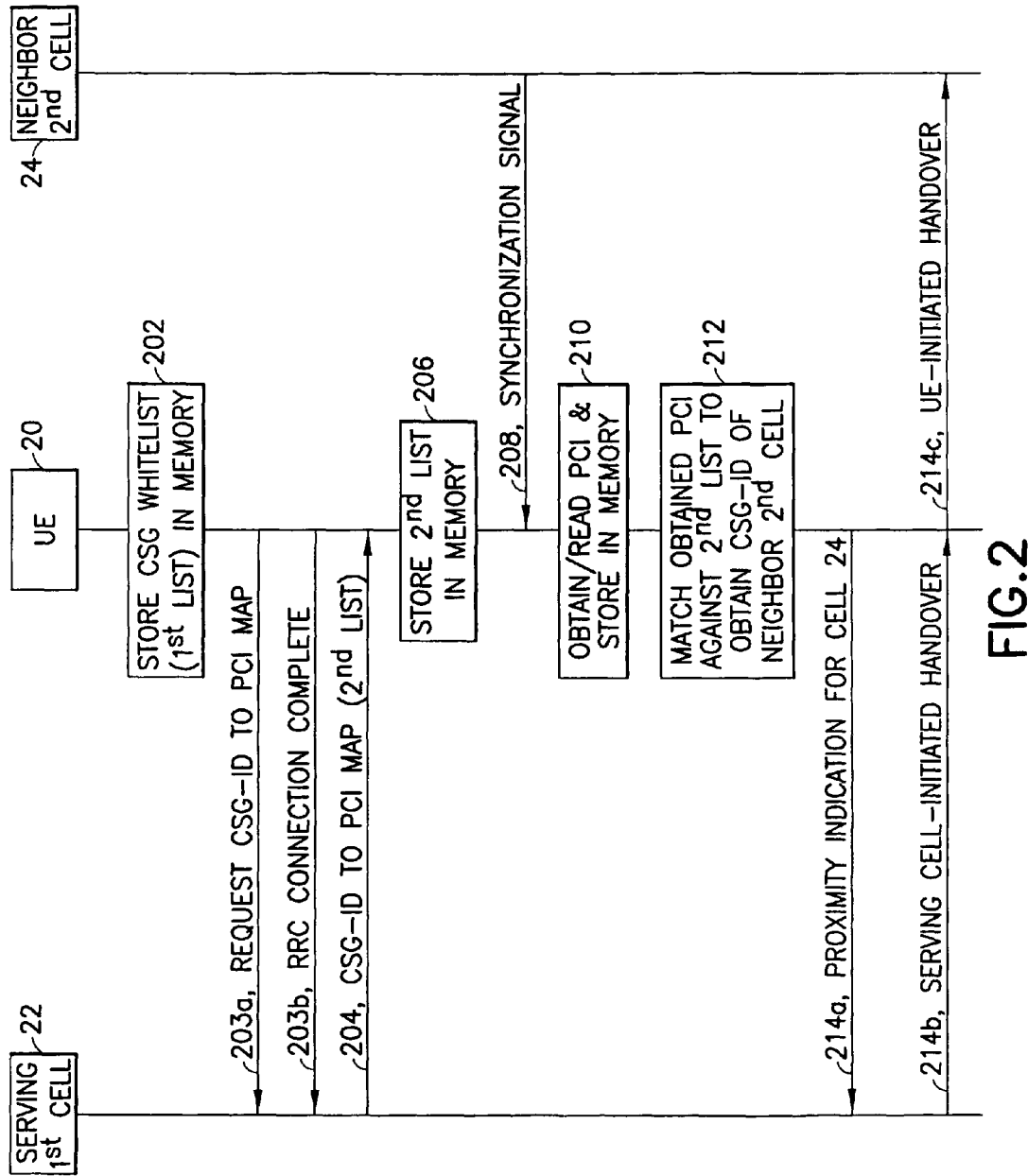
FIG. 2 is a signaling diagram illustrating signaling and actions taken in accordance with a first exemplary embodiment of the invention.

The first embodiment is detailed further with respect to the signaling diagram of FIG. 2. The UE 20 has stored in its local memory at block 202 the conventional CSG whitelist or the first list. The UE 20 already has this list from its home network, or it may have it from the serving $1^{st}$ cell 22 or from an update from the home network passed through its current serving cell 22 or some previous serving cell (not shown). There is a second list which the serving first cell 22 transmits to the UE 20, and this second list has a mapping of CSG IDs to PCIs so that each CSG ID is associated in the second list with one and only one PCI.

By example the serving cell 22 can send this second list to the UE 20 in response to a specific request by the UE at uplink message 203*a*. Such a request may be via an RRC message, a MAC message, or a layer 1 L1 control message for example. Alternatively the serving cell 22 may send it to the UE 20 automatically in response to the UE becoming connected to the serving first cell 22 such as in response to the UE's RRC-CONNECTION COMPLETE message at 203*b*. In another alternative, since in this embodiment the CSG-ID to PCI map/second list is not specific to the particular UE 20 but rather maps the CSG IDs for all CSG cells in the macro cell's coverage area to their respective PCIs, the macro cell 24 may simply transmit (e.g. broadcast or unicast) the second list at message 204 to all UEs in its coverage area. However it receives it, the UE 20 also stores this second list in its local memory at block 206.

Now the UE 20 at FIG. 2 detects a neighbor cell 24. Rather than read and decode its entire system information block the UE 20 instead reads just a smaller transmission by that neighbor second cell 24, such as for example its synchronization signal 208 on the broadcast channel. From that transmission 208 the UE can read the PCI of the transmitting cell 24, and this PCI the UE 20 also stores in its memory at 210. The UE 20 then uses the PCI obtained and stored at block 210 to see if there is a match to any PCI in the second list which was stored at block 206. If yes the UE 20 obtains the CSG-ID for the neighbor second cell 24 by finding the one CSG ID that is associated in that second list with the matched PCI, and then checks so see if that CSG ID is on the first list. If yes the UE 20 assumes it has access rights to that neighbor second cell 24, and if not then the UE 20 assumes it does not.

FIG. 2 concludes assuming the UE 20 does have access rights to the neighbor second cell. If for example the UE 20 is in a RRC CONNECTED state with the serving first cell it may send at message 214*a* a proximity indication to the macro cell 22, and the macro cell will determine if and when a handover to the neighbor second cell 24 is appropriate and initiate such a handover using message 214*b*. If instead the UE 20 is in a RRC-IDLE state with the macro cell 22, the UE 20 can initiate via message 214*c* a handover to the neighbor second cell 24 itself at the time the UE 20 sees it is most appropriate. Specific handover procedures then follow conventional practice.

Figure 3:
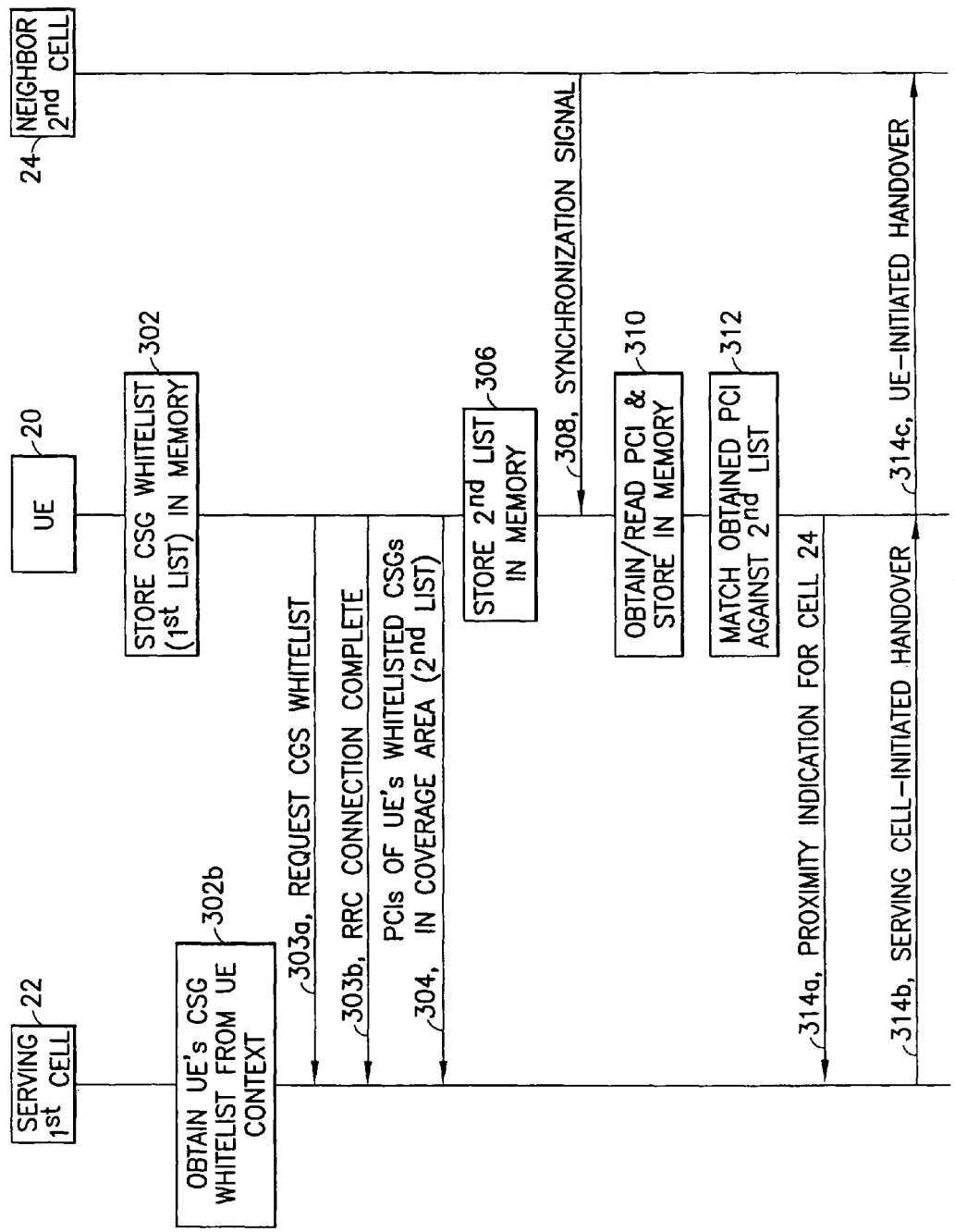
FIG. 3 is a signaling diagram illustrating signaling and actions taken in accordance with a second exemplary embodiment of the invention.

The second embodiment is now detailed with reference to the signaling diagram of FIG. 3. Like the first embodiment, the UE 20 has stored in its local memory at block 302 the conventional CSG whitelist/first list which it obtains as noted above for FIG. 2. In this second embodiment the second list is tailored to the specific UE 20, and so at block 302*b* the serving first cell 22 obtains the UE's CSG whitelist. While it is possible for the serving first cell 22 to obtain this CSG whitelist from the UE 20 itself, to avoid additional wireless signaling overhead FIG. 3 illustrates that the serving first cell 22 obtains it from the UE's home network, such as when the serving first cell 22 obtains the UE's context via higher network nodes (not shown). The serving first cell 22 then creates the second list which is a list of PCIs for all the CSG cells which are both within the UE's CSG whitelist and also within the serving first cell's coverage area. It follows then that if the UE 20 can match a PCI to this second list, the UE 20 assumes it must have access rights to the cell which transmitted that PCI. The serving first cell 22 transmits this second list to the UE 20 at message 304.

Similar to FIG. 2, at FIG. 3 the serving cell 22 can send this second list to the UE 20 in response to a specific request by the UE at uplink message 303*a* (e.g., an RRC message, a MAC message, or a layer 1 L1 control message). Alternatively the serving cell 22 may send it to the UE 20 automatically in response to the UE becoming connected to the serving first cell 22 such as in response to the UE's RRC-CONNECTION COMPLETE message at 303*b*. Unlike the first embodiment, since the second list of PCIs is tailored to the particular UE 20 it is not efficient that the serving first cell 22 broadcast it. However the UE 20 receives it, it also stores this second list in its local memory at block 306.

Like the first embodiment, the UE 20 at FIG. 3 then detects a neighbor cell 24 and reads the neighbor second cell's synchronization signal 308 on the broadcast channel or other smaller transmission by it. From that transmission 308 the UE reads the PCI of the transmitting cell 24, and this PCI the UE 20 also stores in its memory at 310. The UE 20 then uses the PCI obtained and stored at block 310 to see if there is a match to any PCI in the second list which was stored at block 306. If yes the UE 20 assumes it has access rights to that the neighbor second cell 24, and if no the UE 20 assumes it does not.

Like FIG. 2, FIG. 3 concludes similarly in assuming the UE 20 does have access rights to the neighbor second cell. If for example the UE 20 is in a RRC CONNECTED state with the serving first cell it may send at message 314*a* a proximity indication to the macro cell 22, and the macro cell will determine if and when a handover to the neighbor second cell 24 is appropriate and initiate such a handover using message 314*b*. In this case, the UE 20 can report the proximity information and identify the neighbor second cell by its PCI, which the serving first cell 22 will know the matching CSG ID. While the serving cell can order the RRC-CONNECTED UE 20 to read the system information of its neighbor cell 24 prior to a handover to it, typically the UE 20 will only read that system information after the handover so as not to disrupt communications with the serving cell 22. Where the neighbor cell 24 is a CSG cell it might be helpful in conventional practice that the UE 20 reads that neighbor's system information prior to the handover to obtain the CSG ID and thereby avoid re-selecting to a neighbor CSG cell for which the UE 20 has no access rights. But the exemplary embodiments of these teachings allow the UE 20 in the RRC-CONNECTED state to assume with a high degree of accuracy the CSG ID of that neighbor cell without having to read its system information.

If instead the UE 20 is in a RRC-IDLE state with the macro cell 22, the UE 20 can initiate via message 314*c* a handover to the neighbor second cell 24 itself at the time the UE 20 sees it is most appropriate. In this latter case the UE 20 can read the entire system information block of the neighbor second cell 24 if it deems handover to it appropriate, but note this still avoids the UE 20 having to read and decode system information for all its neighbor cells including those CSG cells for which it has no access rights; the UE's decoding burden for neighbor cell system information will be restricted to only a few for which the UE 20 has access rights. Specific handover procedures then follow conventional practice.

In the LTE system there is a mobility management entity MME, which often also functions as the serving gateway S-GW, which is a control/management node higher in the network than the eNodeBs. Embodiments of the invention as detailed above may be facilitated by the following processes higher in the macro network. For each macro cell, the MME will maintain a list of all the CSG cells in the coverage area of the macro cell. This list has an entry for each CSG cell, and each entry in the list is a set of numbers including the carrier frequency, the PCI and the CSG ID. To implement this aspect there will need to be new signaling arranged between the MME and the macro cell 22 so that the macro cell 22 can timely obtain from the MME the appropriate CSG list for all the affected UEs in the macro cell's service area. As noted above the macro cell 22 can in different embodiments broadcast the list to all UEs or transmits the list to every UE 20 that connects to the macro cell 22.

It is conventional that the UE 20 will at regular intervals search for the cells listed in the aforementioned list of CSG cells, in addition to performing normal neighbor cell measurements. Embodiments of these teachings may be initiated in conjunction with such searches; when the UE detects a CSG cell nearby during its routine search it reads the PCI of the neighbor second cell 24 from the synchronization signal which that cell 24 broadcasts. If the UE 20 then finds the PCI in the second list which has the PCI numbers, then as detailed above for the first and second embodiments the UE 20 is able to determine the corresponding CSG ID; either from the second list if the first embodiment or from decoding system information if the second embodiment. For the first embodiment if the UE 20 finds the CSG ID in its first list (the CSG whitelist which has the CSG numbers), then the UE 20 is able to infer that it is allowed to connect to the CSG cell 24. For the second embodiment if the UE 20 finds the PCI it read from the neighbor second cell's transmission in its second list (the PCI list tailored to the particular UE 20), then the UE 20 is able to infer that it is allowed to connect to the CSG cell 24 because the network created the second list such that it includes only PCIs for CSG cells in that specific UE's CSG whitelist.

Embodiments of the invention as described by example above, and particularly the manner by which the UE 20 can obtain the CSG ID of a neighbor second cell 24 without having to read and decode system information from all its neighbor cells, provide the technical effect of improving accuracy for the UE's proximity indication. Since the UE only indicates proximity when the cell is measurable, the UE's proximity indications received by the eNodeB are much more accurate than competing approaches detailed in the background section above. For example, the measurement value of the eNodeB can be provided in the proximity report. Another technical effect is that embodiments of these teachings enable the UE 20 to detect whether it is in the proximity of CSG cells 24 that it is allowed to connect to without reading the system information of all those neighbor cells 24.

The above teachings can be readily expanded beyond only CSG cells. For example, implementations in which the network sends to the UE 20 the second list upon the UE 20 becoming established in the macro cell 22 can be adapted so that there are additional types of cells, apart from or in addition to CSG cells, including within that network-provided list. The UE 20 can for example send to the macro cell 24 a proximity indication for a WLAN cell or other type of 'special' cell which under certain conditions (for example, a static UE or limited UE mobility for the case of WLAN) the macro cell 22 may choose to offload some of the UE's traffic to that special cell. Such indication could also contain additional information regarding the WLAN cell similar to measurement information that can be provided for an LTE cell.

Note that in the above embodiments there is still a possibility that the UE 20 can confuse different CSG cells which use the same PCI, but this lack of absolute certainty is not seen as an impediment since in practice such cell confusion is a remote possibility given that when the network is built and evolving the same PCI is assigned only to cells that are distant from one another.

Figure 4:
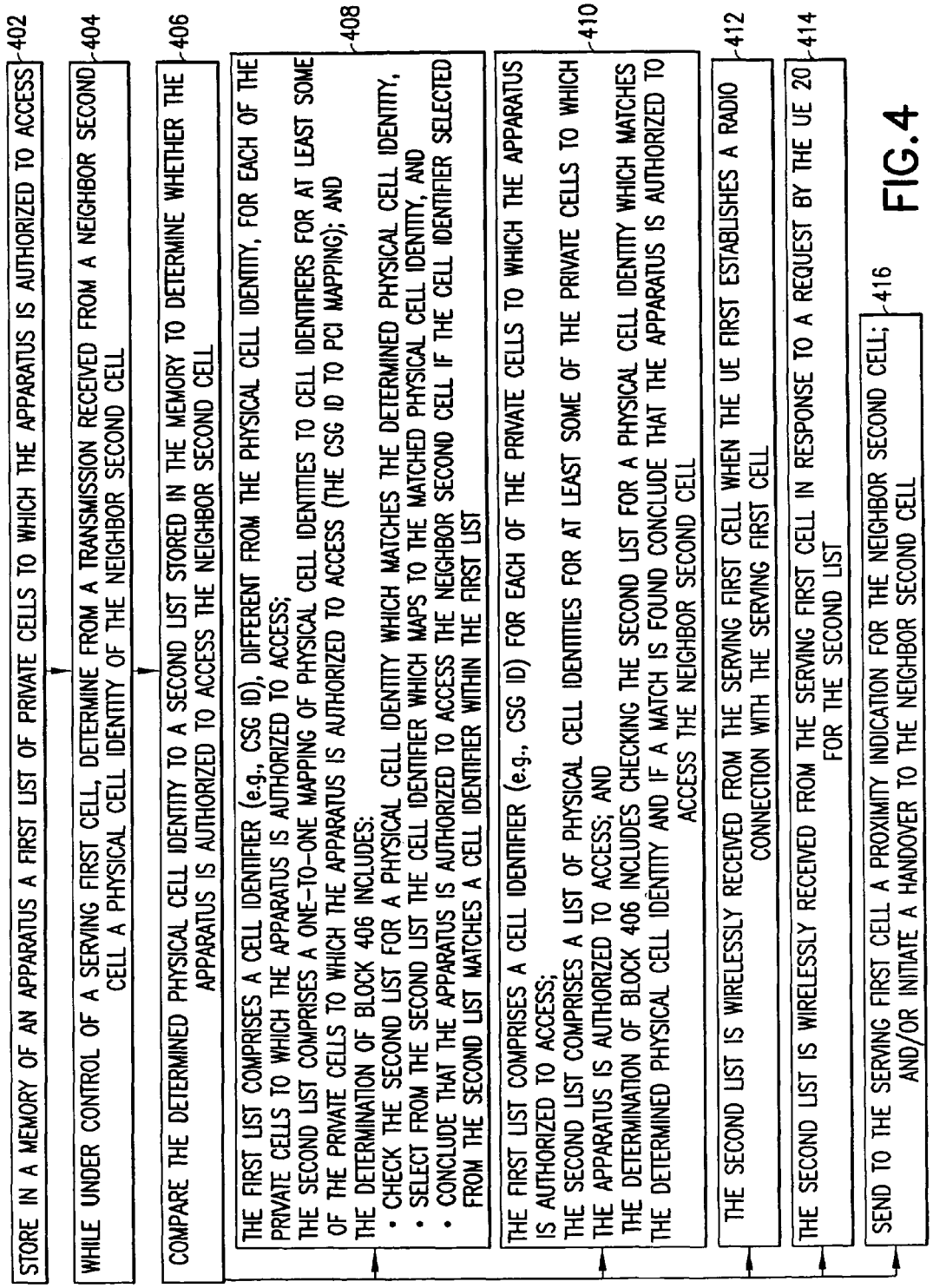
FIG. 4 is a logic flow diagram that illustrates the operation of a method, and a result of execution of computer program instructions embodied on a computer readable memory, in accordance with the exemplary embodiments of this invention.

FIG. 4 above is a logic flow diagram which describes the above exemplary embodiments of the invention from the perspective of the UE 20. FIG. 4 represents results from executing a computer program or an implementing algorithm stored in the local memory of the UE 20, as well as illustrating the operation of a method and a specific manner in which the processor and memory with computer program/algorithm are configured to cause that UE 20 (or one or more components thereof) to operate. The various blocks shown in FIG. 4 may also be considered as a plurality of coupled logic circuit elements constructed to carry out the associated function(s), or specific result or function of strings of computer program code stored in a computer readable memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Blocks 402 and 404 and 406 are generic to the first and second embodiments, and further process blocks of FIG. 4 are optional for various different embodiments and implementations. At block 402 the apparatus stores in its local memory a first list of private cells to which the apparatus is authorized to access. At block 404, while under control of a serving first cell, the apparatus determines from a transmission received from a neighbor second cell a physical cell identity of the neighbor second cell. And at block 406 then is compared the determined physical cell identity to a second list stored in the memory to determine whether the apparatus is authorized to access the neighbor second cell.

The first embodiment detailed also at FIG. 2 is summarized at block 408: the first list is detailed as comprising a cell identifier (e.g., CSG ID) for each of the private cells to which the apparatus is authorized to access; the second list comprises a one-to-one mapping of physical cell identities to cell identifiers for at least some of the private cells to which the apparatus is authorized to access (the CSG ID to PCI mapping); and the determination of block 406 is detailed in that the second list is checked for a physical cell identity which matches the determined physical cell identity, there is selected from the second list the cell identifier which maps to the matched physical cell identity, and it is concluded that the apparatus is authorized to access the neighbor second cell if the cell identifier selected from the second list matches a cell identifier within the first list. As noted above with respect to FIG. 2 in one implementation the second list is received from the serving first cell on a broadcast channel. The cell identifiers are different in type from the physical cell identities; that is any given cell (the neighbor second cell) may be assigned one of each.

The second embodiment detailed also at FIG. 3 is summarized at block 410: the first list is detailed as comprising a cell identifier (e.g., CSG ID), different from the physical cell identity, for each of the private cells to which the apparatus is authorized to access; the second list comprises a list of physical cell identities for at least some of the private cells to which the apparatus is authorized to access (e.g., the UE-specific PCI listing for only the CSGs within the UE's CSG whitelist which are also located in the area of the serving cell); and the determination of block 406 is detailed in that the second list is checked for a physical cell identity which matches the determined physical cell identity and if a match is found it is concluded that the apparatus is authorized to access the neighbor second cell. In this embodiment also the cell identifiers are different in type from the physical cell identities.

Blocks 412 and 414 and 416 are each generic to either embodiment of blocks 408 and 410. At block 412 the apparatus is a UE 20 and the second list is wirelessly received from the serving first cell when the UE first establishes a radio connection with the serving first cell. Such a radio connection may in an LTE system be a RRC-CONNECTED state. At block 414 the apparatus is again a UE 20 and the second list is wirelessly received from the serving first cell in response to a request by the UE 20 for the second list. And at block 416, in response to determining at block 406 there is the further process step of either or both of sending to the serving first cell a proximity indication for the neighbor second cell; and/or initiating a handover to the neighbor second cell.

As described above FIG. 4 represents the case in which the UE is in the RRC-CONNECTED state (assuming an LTE implementation). For the case in which the UE is in the RRC-IDLE state for an LTE implementation, such a UE would be at block 404 camped under the serving cell instead of under its control; it would initiate a handover to the neighbor second cell based on the priority indication status at block 416; and block 414 would not apply. In various embodiments the apparatus executing the process described at FIG. 4 may be the UE 20 as described, or one or more components thereof such as for example a wireless modem configured for use in a UE 20.

Figure 5:
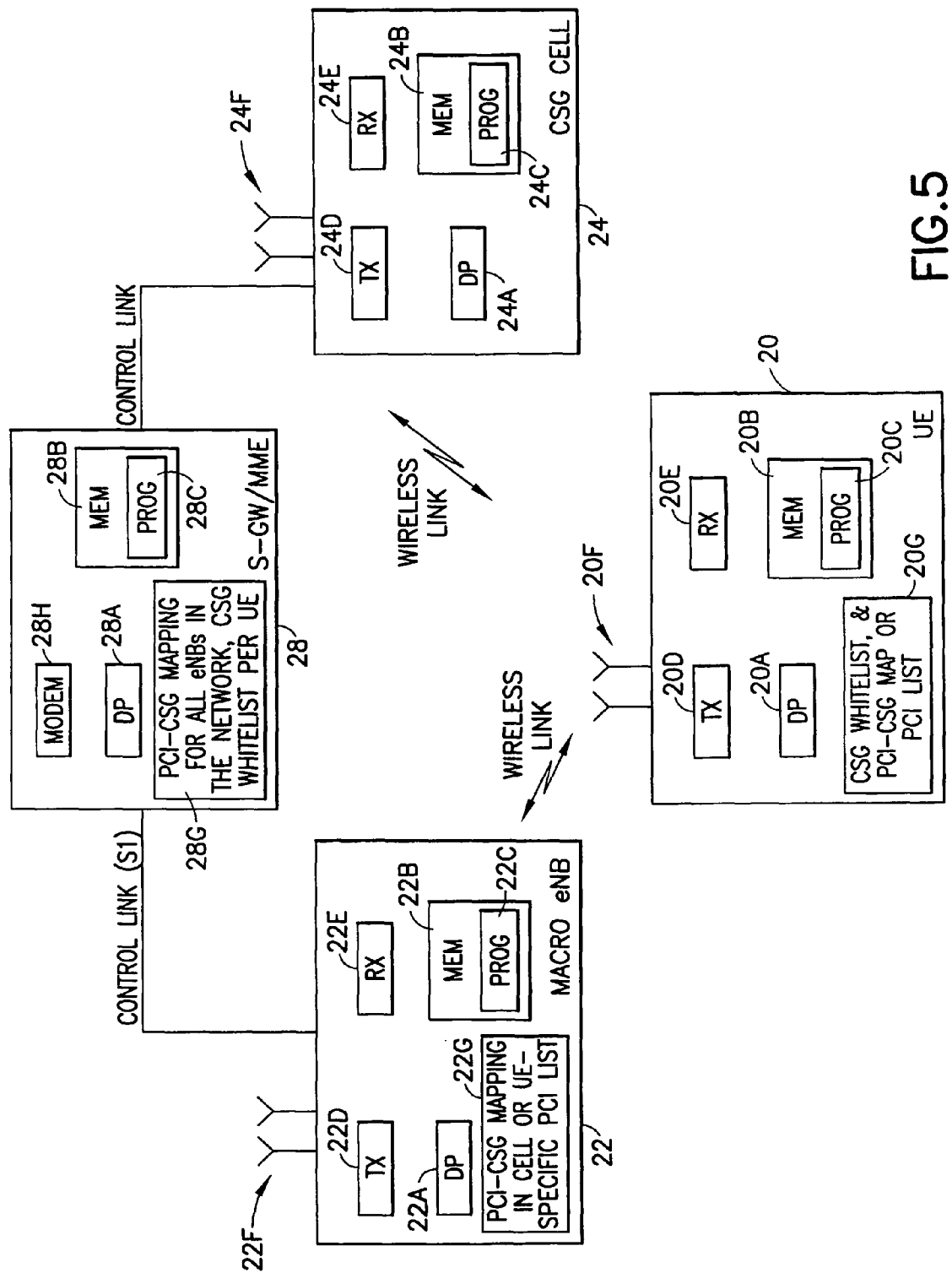
FIG. 5 is a simplified block diagram of various network devices and a UE similar to those shown at FIG. 1, which are exemplary electronic devices suitable for use in practicing the exemplary embodiments of the invention.

Reference is now made to FIG. 5 for illustrating a simplified block diagram of various electronic devices and apparatus that are suitable for use in practicing the exemplary embodiments of this invention. In FIG. 5 a serving first cell/macro cell 22 is adapted for communication over a wireless link with a mobile apparatus, such as a mobile terminal or UE 20. The macro cell 22 may be a macro eNodeB, a remote radio head or relay station, or other type of base station/cellular network access node.

The UE 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the serving first cell/macro cell 22 via one or more antennas 20F. Also shown for the UE 20 at block 20G is the first list implemented as the CSG whitelist and the second list implemented as either the PCI to CSG ID mapping or the PCI list which is specific to that UE 20.

The serving first cell/macro cell 22 similarly includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path, termed at FIG. 5 as a control link which in the LTE system may be implemented as an S1 interface, coupling the serving first cell/macro cell 22 with the S-GW/MME 28 and over which the serving first cell/macro cell 22 may receive the UE's CSG whitelist in various embodiments above. The serving first cell/macro cell 22 creates and stores at block 22G the PCI to CSG ID mapping or the UE specific PCI lists of the various embodiments as detailed above.

Similarly, the S-GW/MME 28 includes processing means such as at least one data processor (DP) 28A, storing means such as at least one computer-readable memory (MEM) 28B storing at least one computer program (PROG) 28C, and communicating means such as a modem 28H for bidirectional communication with the serving first cell/macro cell 22 via the control link and also with the neighbor second cell 24 over the other control link. While not particularly illustrated for the UE 20 or serving first cell/macro cell 22 or neighbor second cell 24, those devices are also assumed to include as part of their wireless communicating means a modem which may be inbuilt on a radiofrequency RF front end chip within those devices 20, 22, 24 and which chip also carries the TX 20D/22D/24D and the RX 20E/22E/24E. The S-GW/MME 28 also has stored in its local memory at 28G the database which has the CSG-PCI mapping for all the eNodeBs under its control, and/or the CSG whitelists for all the UEs under those various eNodeBs as the case may be for the various embodiments detailed above.

The neighbor second cell 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E for bidirectional wireless communications with other UEs under its control via one or more antennas 24F. In certain implementations the neighbor second cell 24 may be embodied as a home eNodeB, referred to in LTE sometimes as a HeNB.

At least one of the PROGs 20C in the UE 20 is assumed to include program instructions that, when executed by the associated DP 20A, enable the device to operate in accordance with the exemplary embodiments of this invention, as detailed above. The serving first cell 22 and the S-GW/MME 28 also have software stored in their respective MEMs to implement certain aspects of these teachings. In these regards the exemplary embodiments of this invention may be implemented at least in part by computer software stored on the MEM 20B, 22B, 28B which is executable by the DP 20A of the UE 20 and/or by the DP 22A/28A of the respective serving first cell 22 and the S-GW/MME 28, or by hardware, or by a combination of tangibly stored software and hardware (and tangibly stored firmware). Electronic devices implementing these aspects of the invention need not be the entire devices as depicted at FIG. 5, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 22B, 24B and 28B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 24A and 28A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
    at least one processor; and
    at least one memory storing a computer program;
in which the at least one memory with the computer program is configured with the at least one processor to cause the apparatus to at least:
    store in the at least one memory a first list of private cells to which the apparatus is authorized to access, the first list comprising a cell identifier for each of the private cells;
    while under control of a serving first cell, determine from a transmission received from a neighbor second cell a physical cell identity of the neighbor second cell; and
    compare the determined physical cell identity to a second list stored in the at least one memory to determine whether the apparatus is authorized to access the neighbor second cell, the second list comprising a one-to-one mapping of physical cell identities to cell identifiers for at least some of the private cells to which the apparatus is authorized to access;
wherein determining whether the apparatus is authorized to access the neighbor second cell comprises at least:
    checking the second list for a physical cell identity which matches the determined physical cell identity;
    selecting from the second list the cell identifier which maps to the matched physical cell identity; and
    concluding that the apparatus is authorized to access the neighbor second cell if the cell identifier selected from the second list matches a cell identifier within the first list.

2. The apparatus according to claim 1, in which the second list is received from the serving first cell on a broadcast channel.

3. An apparatus, comprising:
    at least one processor; and
    at least one memory storing a computer program;
in which the at least one memory with the computer program is configured with the at least one processor to cause the apparatus to at least:
    store in the at least one memory a first list of private cells to which the apparatus is authorized to access, the first list comprising a cell identifier for each of the private cells;
    while under control of a serving first cell, determine from a transmission received from a neighbor second cell a physical cell identity of the neighbor second cell; and
    compare the determined physical cell identity to a second list stored in the at least one memory to determine whether the apparatus is authorized to access the neighbor second cell, the second list comprising a list of physical cell identities for at least some of the private cells to which the apparatus is authorized to access;
wherein determining whether the apparatus is authorized to access the neighbor second cell comprises at least:
    checking the second list for a physical cell identity which matches the determined physical cell identity and if a match is found concluding that the apparatus is authorized to access the neighbor second cell.

4. The apparatus according to claim 3, in which the second list is wirelessly received from the serving first cell, and the second list comprises the physical cell identities of only those cells which are within the first list and within a service area of the serving first cell.

5. The apparatus according to claim 1, in which the apparatus comprises a user equipment and the second list is wirelessly received from the serving first cell when the user equipment first establishes a radio connection with the serving first cell.

6. The apparatus according to claim 1, in which the apparatus comprises a user equipment and the second list is wirelessly received from the serving first cell in response to a request by the user equipment for the second list.

7. The apparatus according to claim 1, in which the at least one memory with the computer program is configured with the at least one processor to cause the apparatus to further at least:
    in response to determining whether the apparatus is authorized to access the neighbor second cell, at least one of:
        sending to the serving first cell a proximity indication for the neighbor second cell; and
        initiating a handover to the neighbor second cell.

8. The apparatus according to claim 1, in which the apparatus comprises a modem configured for use in a user equipment.

9. A method, comprising:
    storing in a memory of an apparatus a first list of private cells to which the apparatus is authorized to access, the first list comprising a cell identifier for each of the private cells;
    while under control of a serving first cell, determining from a transmission received from a neighbor second cell a physical cell identity of the neighbor second cell; and
    comparing the determined physical cell identity to a second list stored in the memory to determine whether the apparatus is authorized to access the neighbor second cell, wherein the second list comprises a one-to-one mapping of physical cell identities to cell identifiers for at least some of the private cells to which the apparatus is authorized to access, and wherein determining whether the apparatus is authorized to access the neighbor second cell comprises:
        checking the second list for a physical cell identity which matches the determined physical cell identity;
        selecting from the second list the cell identifier which maps to the matched physical cell identity; and
        concluding that the apparatus is authorized to access the neighbor second cell if the cell identifier selected from the second list matches a cell identifier within the first list.

10. A method, comprising:
    storing in a memory of an apparatus a first list of private cells to which the apparatus is authorized to access, the first list comprising a cell identifier for each of the private cells to which the apparatus is authorized to access;
    while under control of a serving first cell, determining from a transmission received from a neighbor second cell a physical cell identity of the neighbor second cell; and
    comparing the determined physical cell identity to a second list stored in the memory to determine whether the apparatus is authorized to access the neighbor second cell, wherein the second list is wirelessly received from the serving first cell, and comprises the physical cell identities of only those cells which are within the first list and within a service area of the serving first cell;

and wherein determining whether the apparatus is authorized to access the neighbor second cell comprises:

checking the second list for a physical cell identity which matches the determined physical cell identity and if a match is found concluding that the apparatus is authorized to access the neighbor second cell.

11. The method according to claim 9, in which the apparatus comprises a user equipment and the second list is wirelessly received from the serving first cell when the user equipment first establishes a radio connection with the serving first cell.

12. The method according to claim 9, in which the apparatus comprises a user equipment and the second list is wirelessly received from the serving first cell in response to a request by the user equipment for the second list.

13. The method according to claim 9, in which the method further comprises:

in response to determining whether the apparatus is authorized to access the neighbor second cell, at least one of:
        sending to the serving first cell a proximity indication for the neighbor second cell; and
        initiating a handover to the neighbor second cell.

14. A computer readable memory storing a computer program comprising:

code for storing in a memory of an apparatus a first list of private cells to which the apparatus is authorized to access, the first list comprising a cell identifier for each of the private cells to which the apparatus is authorized to access;

code for determining from a transmission received from a neighbor second cell, while the apparatus is under control of a serving first cell, a physical cell identity of the neighbor second cell; and code for comparing the determined physical cell identity to a second list stored in the memory to determine whether the apparatus is authorized to access the neighbor second cell, the second list comprising a one-to-one mapping of physical cell identities to cell identifiers for at least some of the private cells to which the apparatus is authorized to access, and wherein the code for determining whether the apparatus is authorized to access the neighbor second cell comprises:

code for checking the second list for a physical cell identity which matches the determined physical cell identity;
        code for selecting from the second list the cell identifier which maps to the matched physical cell identity; and
        code for concluding that the apparatus is authorized to access the neighbor second cell if the cell identifier selected from the second list matches a cell identifier within the first list.

15. A computer readable memory storing a computer program comprising:

code for storing in a memory of an apparatus a first list of private cells to which the apparatus is authorized to access, the first list comprising a cell identifier for each of the private cells to which the apparatus is authorized to access;

code for determining from a transmission received from a neighbor second cell, while the apparatus is under control of a serving first cell, a physical cell identity of the neighbor second cell; and code for comparing the determined physical cell identity to a second list stored in the memory to determine whether the apparatus is authorized to access the neighbor second cell, wherein the second list is wirelessly received from the serving first cell, and comprises the physical cell identities of only those cells which are within the first list and within a service area of the serving first cell; and wherein the code for comparing determines whether the apparatus is authorized to access the neighbor second cell by checking the second list for a physical cell identity which matches the determined physical cell identity and if a match is found concluding that the apparatus is authorized to access the neighbor second cell.

16. The computer readable memory according to claim 14, in which the apparatus comprises a user equipment and the second list is wirelessly received from the serving first cell when the user equipment first establishes a radio connection with the serving first cell.

17. The computer readable memory according to claim 14, in which the apparatus comprises a user equipment and the second list is wirelessly received from the serving first cell in response to a request by the user equipment for the second list.

\* \* \* \* \*